United States Patent
Tanaka et al.

(10) Patent No.: US 10,620,693 B2
(45) Date of Patent: Apr. 14, 2020

(54) APPARATUS AND METHOD FOR DISPLAYING IMAGE IN VIRTUAL SPACE

(71) Applicant: CANON KABUSHIKI KAISHA, Tokyo (JP)

(72) Inventors: Yasumi Tanaka, Funabashi (JP); Sho Matsuda, Yokosuka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 13 days.

(21) Appl. No.: 15/438,380

(22) Filed: Feb. 21, 2017

(65) Prior Publication Data

US 2017/0243401 A1    Aug. 24, 2017

(30) Foreign Application Priority Data

Feb. 23, 2016   (JP) .................................. 2016-032477

(51) Int. Cl.
  *G06T 19/00*   (2011.01)
  *G06F 3/01*    (2006.01)
  *G06K 9/00*    (2006.01)

(52) U.S. Cl.
  CPC .......... *G06F 3/011* (2013.01); *G06K 9/00671* (2013.01)

(58) Field of Classification Search
  CPC ............................... G06T 19/006; G06F 3/011
  USPC ........................................................ 345/633
  See application file for complete search history.

(56) References Cited

U.S. PATENT DOCUMENTS

| 2013/0222612 A1* | 8/2013 | Sako ................... H04N 5/23293 |
| | | 348/207.1 |
| 2014/0139519 A1* | 5/2014 | Mit ......................... G06T 17/05 |
| | | 345/419 |
| 2016/0027213 A1* | 1/2016 | Burns ....................... G06T 7/73 |
| | | 345/633 |
| 2016/0027217 A1* | 1/2016 | da Veiga ................... G06T 7/73 |
| | | 345/8 |

FOREIGN PATENT DOCUMENTS

JP    2008-134161 A    6/2008

OTHER PUBLICATIONS

Kiyohide Satoh, Shinji Uchiyama, Hideyuki Tamura, "A Review of Registration Techniques in Mixed Reality" (2003), pp. 171-180, Transactions of the Virtual Reality Society of Japan, vol. 8, No. 2.

* cited by examiner

*Primary Examiner* — Hai Tao Sun
(74) *Attorney, Agent, or Firm* — Canon USA, Inc. IP Division (57) ABSTRACT

An information processing apparatus includes a viewpoint information acquisition unit that acquires viewpoint information concerning a viewer, a data input unit that inputs virtual space data, a specifying unit that specifies a virtual reference surface corresponding to a real reference surface in the virtual space data, a determination unit that determines positional relationship between the virtual reference surface and the real reference surface, a correction unit that corrects the virtual space data based on the positional relationship, and a generation unit that generates a display image based on the corrected virtual space data and the viewpoint information.

15 Claims, 12 Drawing Sheets

| FLOOR SURFACE INFORMATION ||
|---|---|
| NAME | HEIGHT (mm) |
| GL | 0 |
| 1F | 1000 |
| 2F | 4000 |
| 3F | 7000 |
| 4F | 10000 |

FIG.10

| FLOOR SURFACE INFORMATION ||
|---|---|
| NAME | HEIGHT (mm) |
| GL | 0 |
| 1F | 1000 |
| 2F | 4000 |
| 3F | 7000 |
| 4F | 10000 |

FIG.12

APPARATUS AND METHOD FOR DISPLAYING IMAGE IN VIRTUAL SPACE

BACKGROUND

Field

The present disclosure relates to displaying of a virtual object in a virtual space.

Description of the Related Art

In recent years, studies on mixed reality (MR) for achieving seamless connection between a real space and a virtual space have been vigorously conducted. For example, a device that presents MR includes the following configuration. Such a device displays an image on which an image of a virtual reality space, e.g., a virtual object or character information rendered with computer graphics, is overlapped on an image in a real space captured by an image capturing apparatus such as a video camera. The image of the virtual reality space is generated in accordance with a position and an orientation of the image capturing apparatus. The display method by such a device is known as a video see-through method. Such a system can be achieved with a head-mounted display (HMD) used as a display, e.g., see Japanese Patent Application Laid-Open No. 2008-134161.

An image display device can be implemented by an optical see-through method. In this method, an image in a virtual space, generated in accordance with a position and an orientation of a viewpoint of an operator, is displayed on the HMD displaying an image in the real space in a see-through manner.

A case is considered in which a viewer experiences MR in a virtual object such as a building in a mixed reality space. In such a case, alignment of a floor surface of the virtual object and a floor surface in the real space, on which the viewer is actually standing, has been conventionally conducted by moving positional coordinates of the virtual object in accordance with numerical values input with an input device such as a keyboard. Alternatively, the movement is achieved by a manual operation on a game controller and the like for moving the virtual object.

SUMMARY

Embodiments are directed to an easy alignment between a floor surface in a real space and a floor surface in a virtual space.

An information processing apparatus according to aspects of embodiments includes a viewpoint information acquisition unit configured to acquire viewpoint information concerning a viewer, a data input unit configured to input virtual space data, a specifying unit configured to specify a virtual reference surface corresponding to a real reference surface in the virtual space data, a determination unit configured to determine positional relationship between the virtual reference surface and the real reference surface, a correction unit configured to correct the virtual space data based on the positional relationship, and a generation unit configured to generate a display image based on the corrected virtual space data and the viewpoint information.

Further features will become apparent from the following description of exemplary embodiments with reference to the attached drawings.

DESCRIPTION OF THE EMBODIMENTS

Exemplary embodiments are described in detail below with reference to the attached drawings. It is to be noted that the exemplary embodiments are not limiting.

Figure 1:
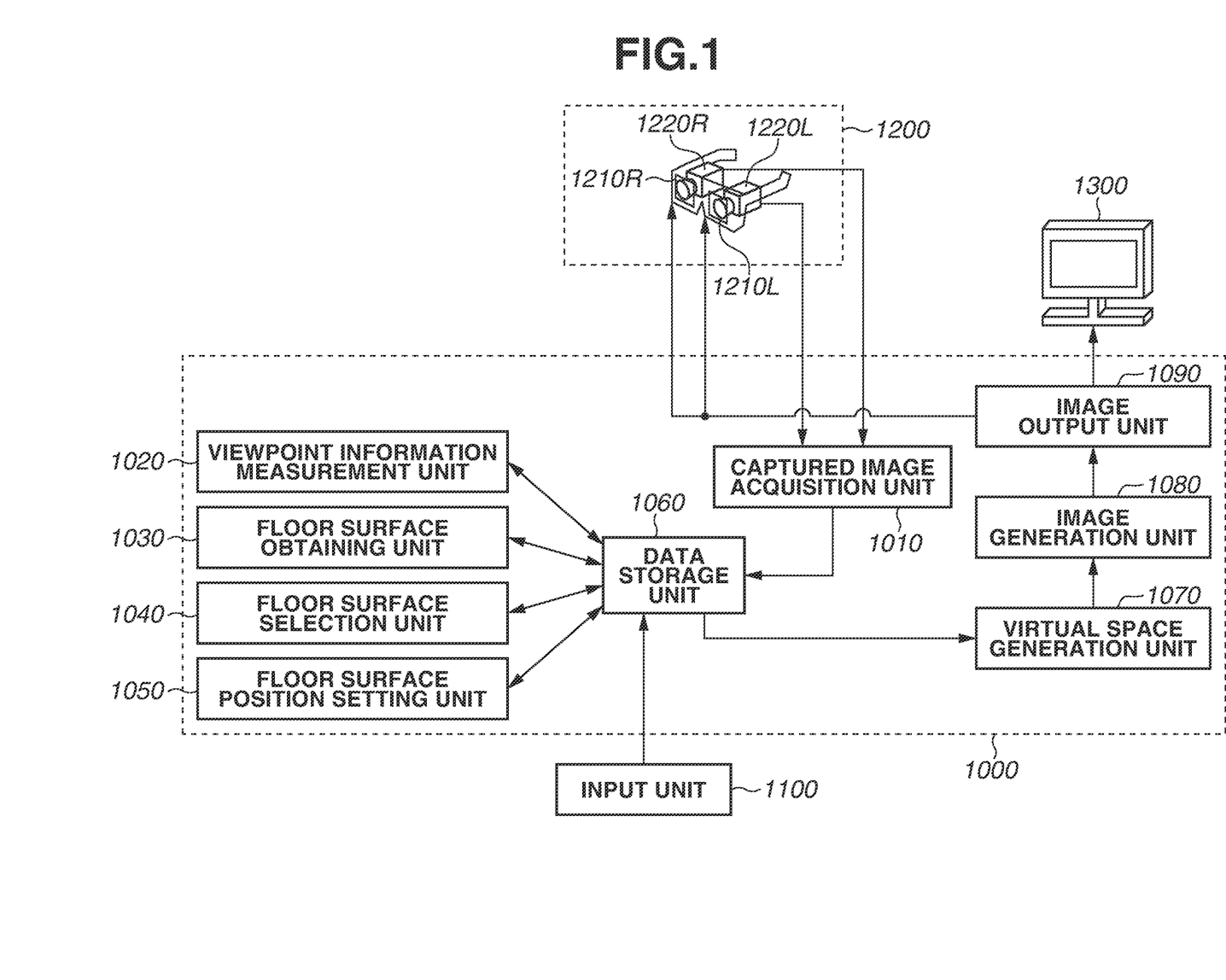
FIG. 1 is a block diagram illustrating a functional configuration of a system according to a first exemplary embodiment.

FIG. 1 is a block diagram illustrating a functional configuration of a system according to a first exemplary embodiment. As illustrated in FIG. 1, the system according to the present exemplary embodiment includes an information processing apparatus 1000, an input unit 1100, a display device 1300, and a head-mounted display (HMD) 1200. The information processing apparatus 1000 includes a captured image acquisition unit 1010, a viewpoint information measurement unit 1020, a floor surface obtaining unit 1030, a floor surface selection unit 1040, a floor surface position setting unit 1050, a data storage unit 1060, a virtual space generation unit 1070, an image generation unit 1080, and an image output unit 1090. The information processing apparatus 1000 and the HMD 1200 are connected to each other in such a manner that data communications can be performed therebetween. The information processing apparatus 1000 and the HMD 1200 can be in wired or wireless connection.

First, the information processing apparatus 1000 will be described.

The captured image acquisition unit 1010 acquires a real space image for the right eye and a real space image for the left eye, transmitted from an image capturing apparatus 1220 including an image capturing apparatus 1220R for the right eye and an image capturing apparatus 1220L for the left eye, to input an image. The captured image acquisition unit 1010 stores the acquired real space images in the data storage unit 1060.

The viewpoint information measurement unit 1020 measures the position and the orientation of the image capturing apparatus 1220 from the captured image stored in the data storage unit 1060 as viewpoint information. Alternatively, the center of the viewer's head or the center between the image capturing apparatus 1220L and the image capturing apparatus 1220R can be measured as the viewpoint information, instead of the position and the orientation of the image capturing apparatus 1220. Various research reports related to a method for measuring viewpoint position and orientation information have been released. For example, see "A Review of Registration Techniques in Mixed Reality" by Sato, Uchiyama, and Tamura, Transaction of the Virtual Reality Society of Japan VOL. 8, NO. 2, pp. 171 to 180, 2003. Herein, any measurement technique can be employed, and a magnetic sensor and an optical sensor can be used. The measured viewpoint position and orientation information is stored in the data storage unit 1060.

The floor surface obtaining unit 1030 obtains a surface corresponding to the floor surface in a first virtual object stored in the data storage unit 1060, and stores the floor surface information in the data storage unit 1060. How the floor surface is obtained is described in detail with reference to a flowchart in FIG. 6.

The floor surface selection unit 1040 selects a specific floor surface from the floor surface information stored in the data storage unit 1060, and stores the information about the floor surface in the data storage unit 1060. How the floor surface is selected is described in detail below with reference to the flowchart in FIG. 6.

The floor surface position setting unit 1050 performs setting in such a manner that a height position of the floor surface information stored in the data storage unit 1060 matches the position of the floor in the real space on which the viewer stands. How the setting is performed is described in detail below with reference to the flowchart in FIG. 6.

The virtual space generation unit 1070 reads and inputs data on a virtual space stored in the data storage unit 1060, and generates the virtual space. The data on the virtual space includes data related to virtual objects forming the virtual space and data related to a light source that illuminates the inside in the virtual space.

The image generation unit 1080 generates an image (virtual space image) in the virtual space as viewed from the viewpoint in the virtual space generated by the virtual space generation unit 1070. Then, the image generation unit 1080 first renders the real space image, stored in the data storage unit 1060, in a memory managed by the image generation unit 1080. Then, the image generation unit 1080 renders the virtual space image on the rendered real space image in a superimposed manner. Thus, a composite image from the real space image and the virtual space image is generated in the memory. Then, the image generation unit 1080 outputs the generated virtual reality space image to the display devices 1210R and 1210L of the HMD 1200. At the same time, the virtual space image can be displayed on the display device 1300.

Alternatively, a display device other than the HMD 1200 can be used. Examples of such a display device include display terminals such as a tablet or a smartphone. Techniques for generating an image in the virtual space as viewed from a viewpoint with a predetermined position and orientation have been known, and thus will not be described in detail.

The input unit 1100 is a device with which a user operation can be input to the information processing apparatus 1000. The input unit 1100 can be used when the information processing apparatus 1000 issues an instruction to the floor surface selection unit 1040.

As described above, the data storage unit 1060 stores various types of information, and includes a random-access memory (RAM) and a hard disk drive (HDD) device. The data storage unit 1060 stores the information to be stored in the data storage unit 1060 as described above, as well as information described as known information in the present exemplary embodiment.

Next, the HMD 1200 will be described. The HMD 1200 is a display apparatus to which the display device 1210 including a liquid crystal screen and the image capturing apparatus 1220, such as a video camera, are fixed. Unless the display device 1210R for the right eye, the display device 1210L for the left eye, the image capturing apparatus 1220R for the right eye and the image capturing apparatus 1220L for the left eye are specifically described, hereinafter, a display device and an image capturing apparatus are simply referred to as the display device 1210 and the image capturing apparatus 1220, with no reference signs R and L, respectively.

Figure 2:
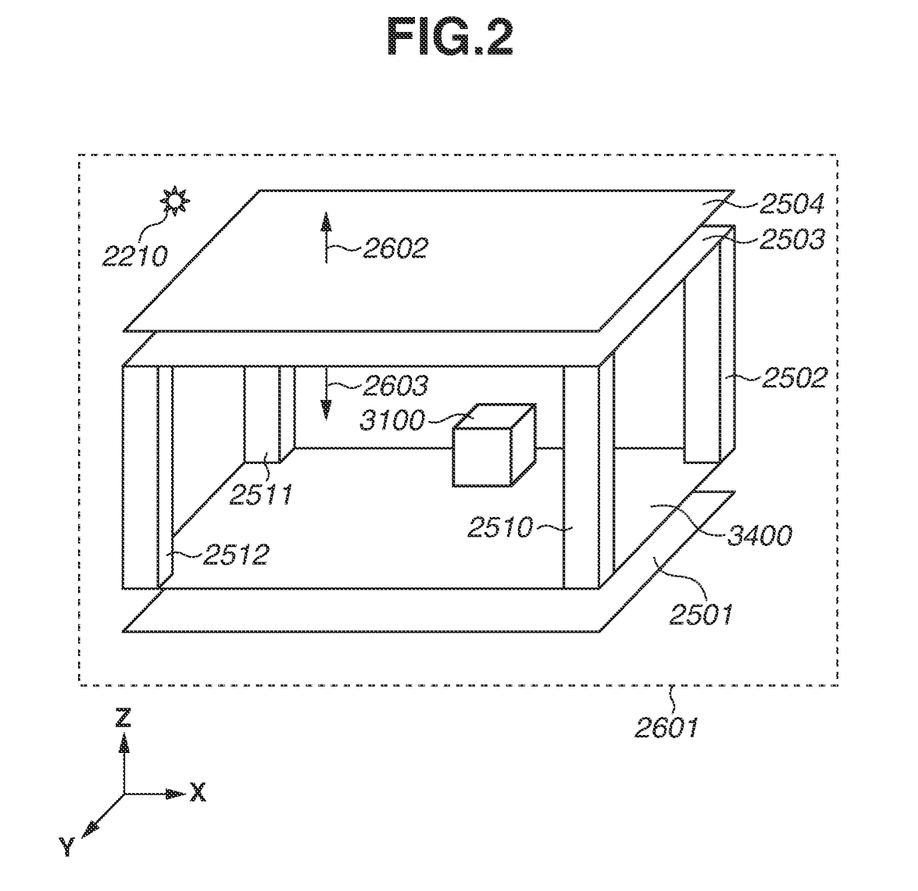
FIG. 2 is a diagram schematically illustrating a virtual space.

FIG. 2 is diagram schematically illustrating a virtual space. Virtual space 2601 includes a virtual light source 2210, a virtual object 2502, a virtual object 3100, a virtual surface 2504, a virtual surface 2503, a virtual surface 3400, and a virtual surface 2501. Each number of virtual light sources, virtual objects and virtual surfaces can be one or more. The virtual light source 2210 can be data related to a light source that illuminates the inside in the virtual space 2601, and can be an image based lighting (IBL).

The virtual object 2502, a virtual object 2510, a virtual object 2511, a virtual object 2512, and a virtual object 3100 can each be a surface model or a solid model. A front surface of the virtual surface 2504 is a surface in a normal direction 2602. Similarly, a front surface of the virtual surface 2503 is a surface in a normal direction 2603. The same applies to other surfaces.

Figure 6:
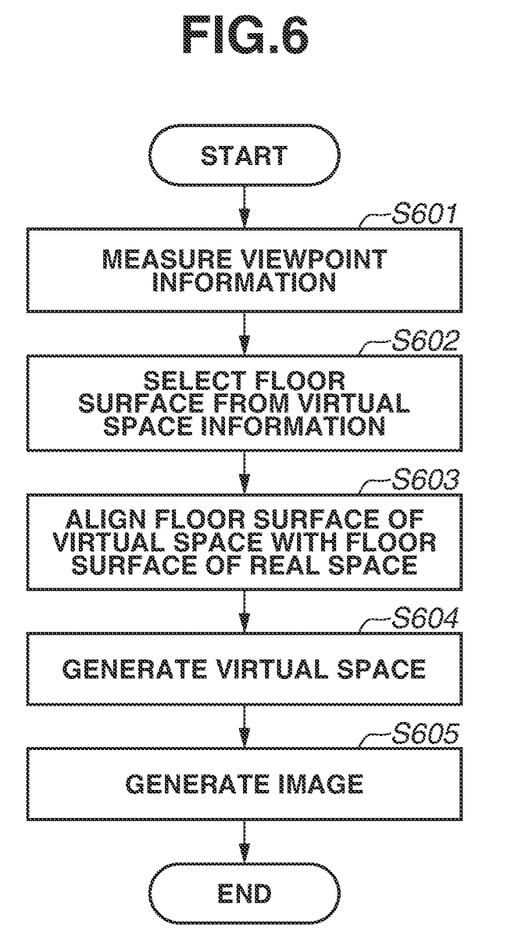
FIG. 6 is a flowchart illustrating a procedure of processing according to the first exemplary embodiment.

FIG. 6 is a flowchart illustrating a procedure of processing executed by the information processing apparatus 1000 to generate a mixed reality (MR) image, and output the MR image to the HMD 1200 or the display device 1300.

First, in step S601, the captured image acquisition unit 1010 acquires the captured image from the image capturing apparatus 1220 illustrated in FIG. 1. The viewpoint information measurement unit 1020 measures position and orientation information on the image capturing apparatus 1220 based on the captured image, to measure viewpoint information. Various research reports related to a method for measuring the position and the orientation have been released, e.g., "A Review of Registration Techniques in Mixed Reality" as described above. In the present exemplary embodiment, any known measurement technique can be employed, and a magnetic sensor and an optical sensor can be used.

Next, in step S602, the floor surface selection unit 1040 selects a floor surface from the virtual space information. A method for selecting the floor surface is described with reference to FIG. 2.

In FIG. 2, the floor surface with the normal direction extending upward (in the positive direction on a Z axis in the present exemplary embodiment) is selected in the virtual space 2601. The surface 3400 with the normal direction extending upward (in the positive direction on the Z axis) is one example of the floor surface in the virtual space 2601. Similarly, other surfaces satisfying the condition are automatically selected.

Alternatively, the floor surface can be selected as follows. Specifically, any number can be set as the number of vertices of a surface, and a surface with vertices of the set number or more can be selected as the floor surface. Furthermore, any value can be set for the area of a surface, and a surface with an area larger than the set value can be selected as the floor surface.

Figure 7:
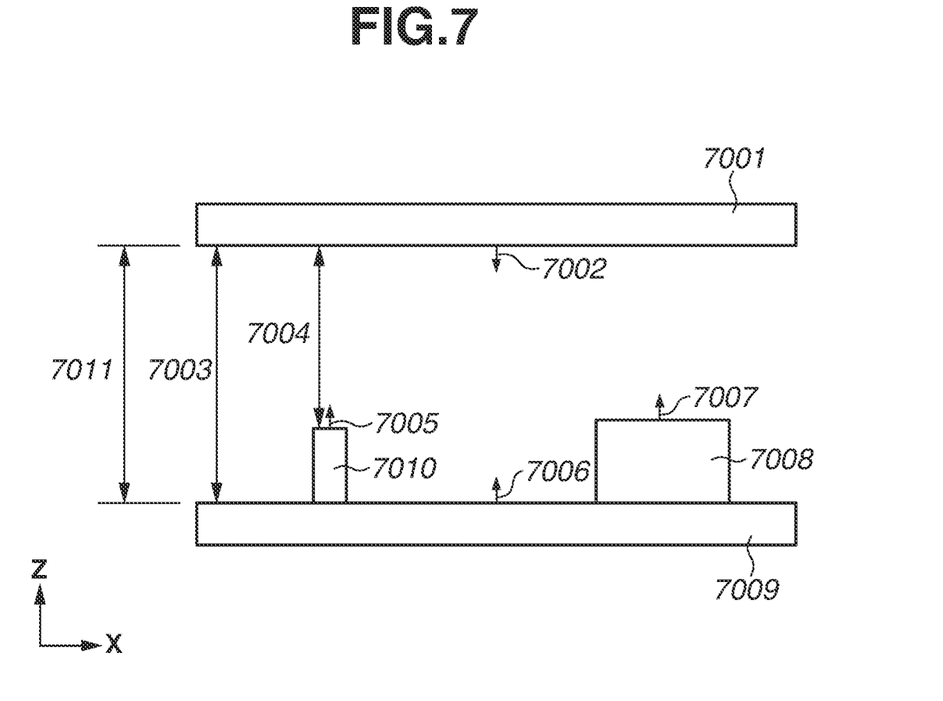
FIG. 7 is a diagram illustrating a method for selecting a floor surface.

Another method of selecting the floor surface is described with reference to FIG. 7 illustrating an example in a virtual space. In the method illustrated in FIG. 7, the floor surface is selected based on a direction of a normal line of a surface and a distance between surfaces. A surface 7001 includes a normal line 7002. A surface 7008 includes a normal line 7007. A surface 7009 includes a normal line 7006. A surface 7010 includes a normal line 7005. A distance 7003 is a distance between the surface 7001 and the surface 7009. A distance 7004 is a distance between the surface 7001 and the surface 7010.

In this example, the method of selecting the floor surface includes acquiring a distance between a surface with a normal line extending vertically downward (in the negative direction on the Z axis in the present exemplary embodiment) and a surface with a normal line extending vertically upward (in the positive direction on the Z axis in the present exemplary embodiment). For example, the surface having the normal line extending vertically downward is, for example, the surface 7001, and the surface with the normal line extending vertically upward is, for example, the surface 7005, the surface 7008, the surface 7009, and the surface 7010. Only a surface having the normal line extending vertically upward and having a distance that is longer than or equal to a predetermined distance (a distance 7011 or more) is selected as the floor surface.

Thus, the surface 7009 with the distance that is longer than or equal to the distance 7011 is selected as the floor surface. Similarly, surfaces having a normal line extending upward (in the positive direction on the Z axis in the present exemplary embodiment) and having the distance that is longer than or equal to the distance 7011, in the virtual space, are selected as the floor surfaces. A surface having a normal line extending vertically upward, from among surfaces having distances to a closest surface having a normal line extending in the opposite direction (vertically downward) being longer than or equal to the distance 7011, can be selected as the floor surface.

In step S603, the floor surface position setting unit 1050 aligns the floor surface in the virtual space with the floor surface in the real space. How the alignment is performed will be described with reference to FIG. 3 to FIG. 5.

Figure 3:
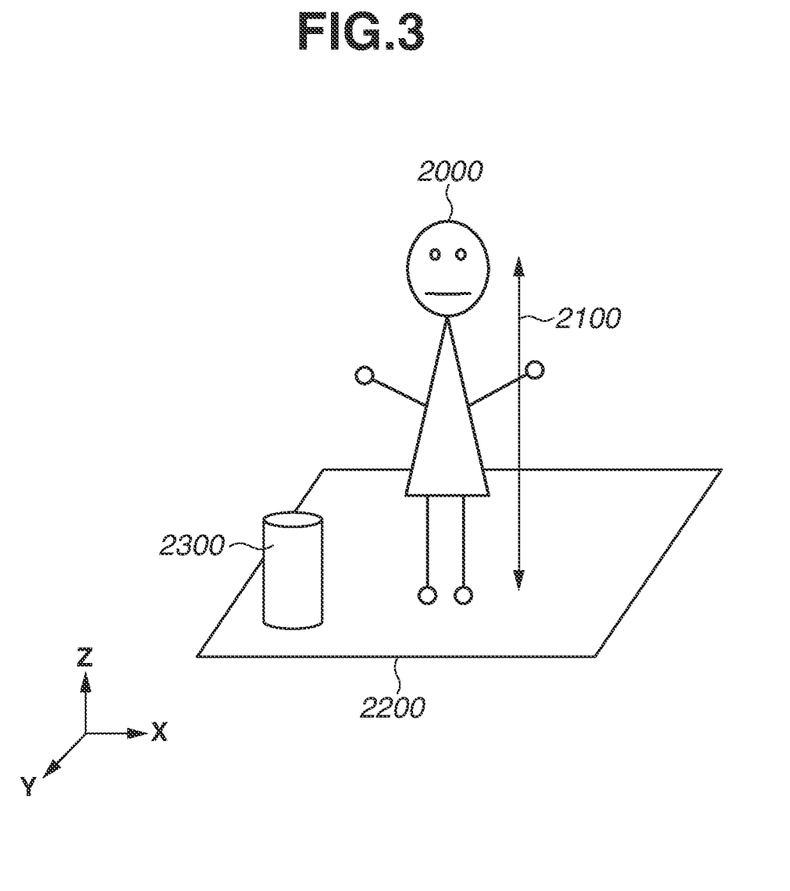
FIG. 3 is a diagram illustrating a state where a viewer is in a real space.

FIG. 3 illustrates a state where a viewer 2000 stands in a real space. In FIG. 3, the portions that are the same as those in FIG. 2 are denoted with the same reference numerals, and the descriptions thereof will be omitted. A height 2100 is a height from the floor surface to a position of the viewer's eyes. The height 2100 is obtained by using the position and orientation information obtained in step S601 as described above. A real floor surface 2200 is an actually existing floor surface on which the viewer stands. A real object 2300 is an actually existing object.

Figure 4:
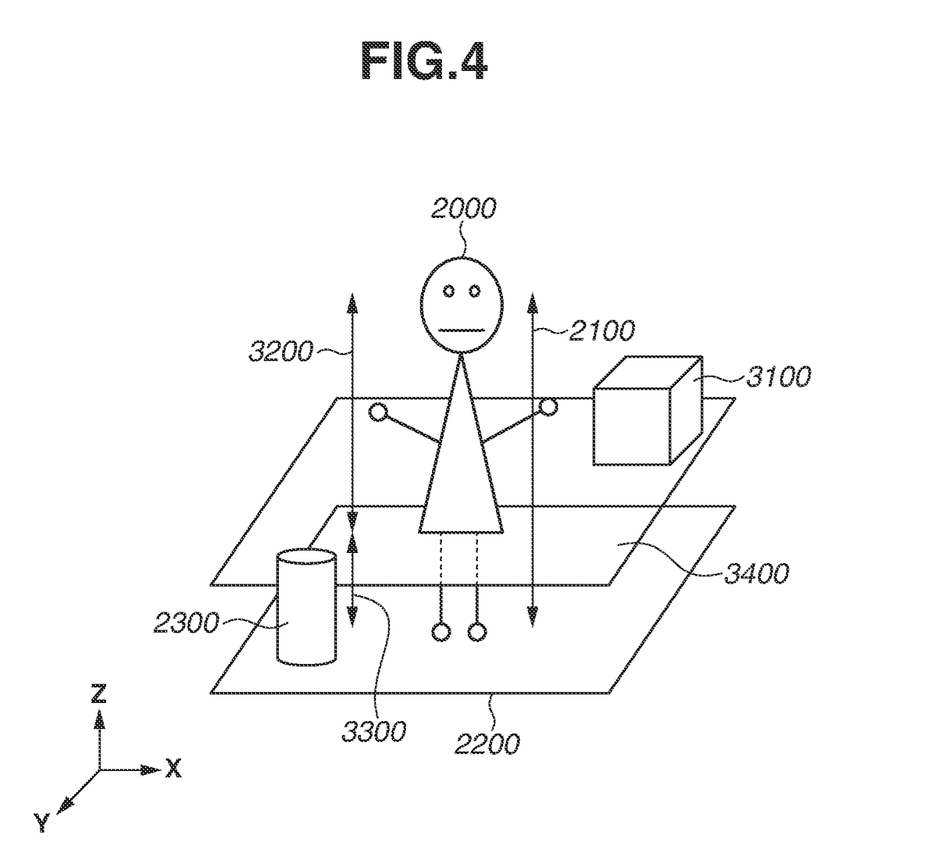
FIG. 4 is a diagram illustrating a state where the viewer is experiencing mixed reality (MR) in an MR space.

FIG. 4 illustrates a state where the viewer is experiencing MR in the MR space. Portions that are the same between FIG. 2 and FIG. 3 are denoted with the same reference numerals, and the description thereof will be omitted. A distance 3200 is a distance between a virtual floor surface 3400 and a viewpoint of the viewer 2000. A distance 3300 is a distance between the real floor surface 2200 and the virtual floor surface 3400.

Figure 5:
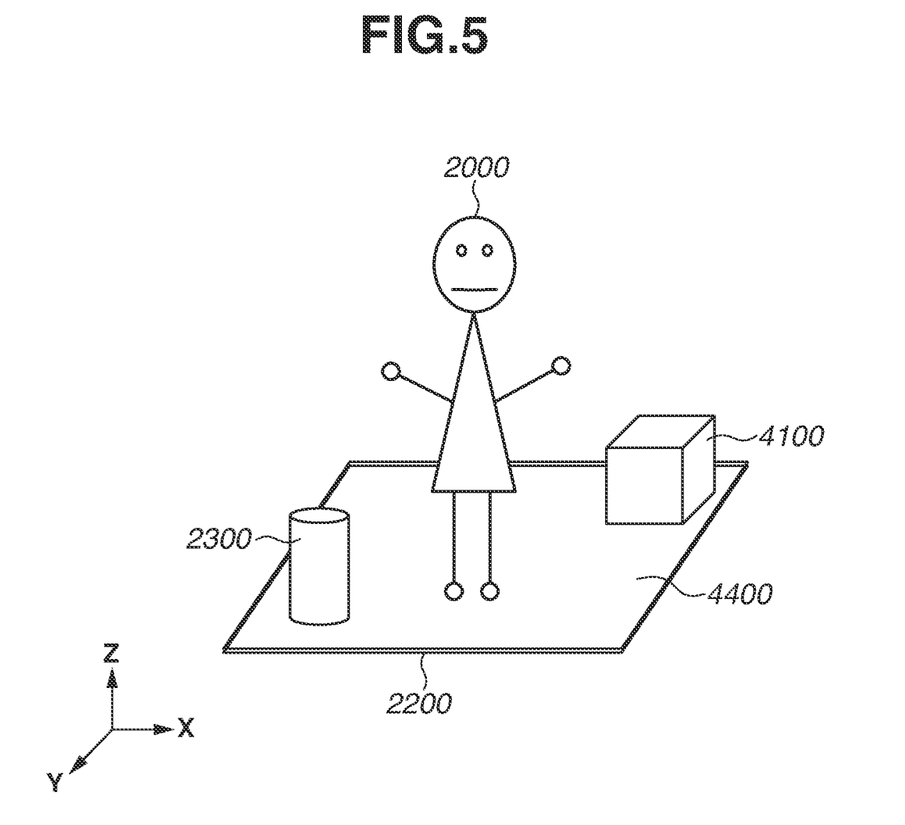
FIG. 5 is a diagram illustrating a state where a floor surface in a virtual space is aligned with a floor surface in the real space in the MR space.

FIG. 5 illustrates a state where the floor surface in the virtual space is aligned with the floor surface in the real space in the mixed reality space. Portions in FIG. 5 that are the same as those in FIGS. 2 to 4 are denoted with the same reference numerals, and the description thereof will be omitted. A virtual object 4100 corresponds to the virtual object 3100, illustrated in FIG. 3, after being moved. A virtual floor surface 4400 corresponds to the virtual floor surface 3400, illustrated in FIG. 4, after being moved.

Next, a method of aligning the floor surface in the virtual space with the floor surface in the real space is described. When the viewer experiences MR, the experience generally starts with the body of the viewer penetrating the virtual floor surface as illustrated in FIG. 4, unless the coordinate value of the virtual floor surface in the Z axis direction is not 0.

Then, the virtual floor surface 3400 having the distance 3200 to the viewpoint of the viewer 2000 is extracted. The distance 3200 is the smallest one of the distances from the floor surfaces selected in step S602 to the viewpoint. Then, the distance 3300 between the virtual floor surface 3400 and the real floor surface 2200 is obtained, and the virtual space 2601 illustrated in FIG. 2 is moved by the distance 3300. As a result, the virtual floor surface 3400 and the virtual object 3100 respectively move to the positions of the virtual floor surface 4400 and the virtual object 4100 in FIG. 5. Similarly, the virtual objects, the virtual surfaces, and the virtual light source, as the components in the virtual space 2601, are moved.

In the present exemplary embodiment, the movement distance 3300 is obtained by extracting the floor surface having the shortest distance 3200 to the viewpoint of the viewer 2000. Alternatively, the viewer can use a graphic user interface (GUI) to designate a desired floor surface from a plurality of floor surfaces obtained in step S602.

In step S604, the floor surface position setting unit 1050 sets the position and orientation information of a virtual camera, based on the position and orientation information of the image capturing apparatus 1220 obtained in step S601, and places the virtual camera in the virtual space after being moved in step S603. Then, the virtual space generation unit 1070 generates a virtual image based on the position and orientation information of the image capturing apparatus 1220 obtained in step S601 and the information in the virtual space after the movement in step S603. In step S605, the image generation unit 1080 generates an image obtained by overlaying the virtual image on the captured image acquired in step S601.

Figure 8:
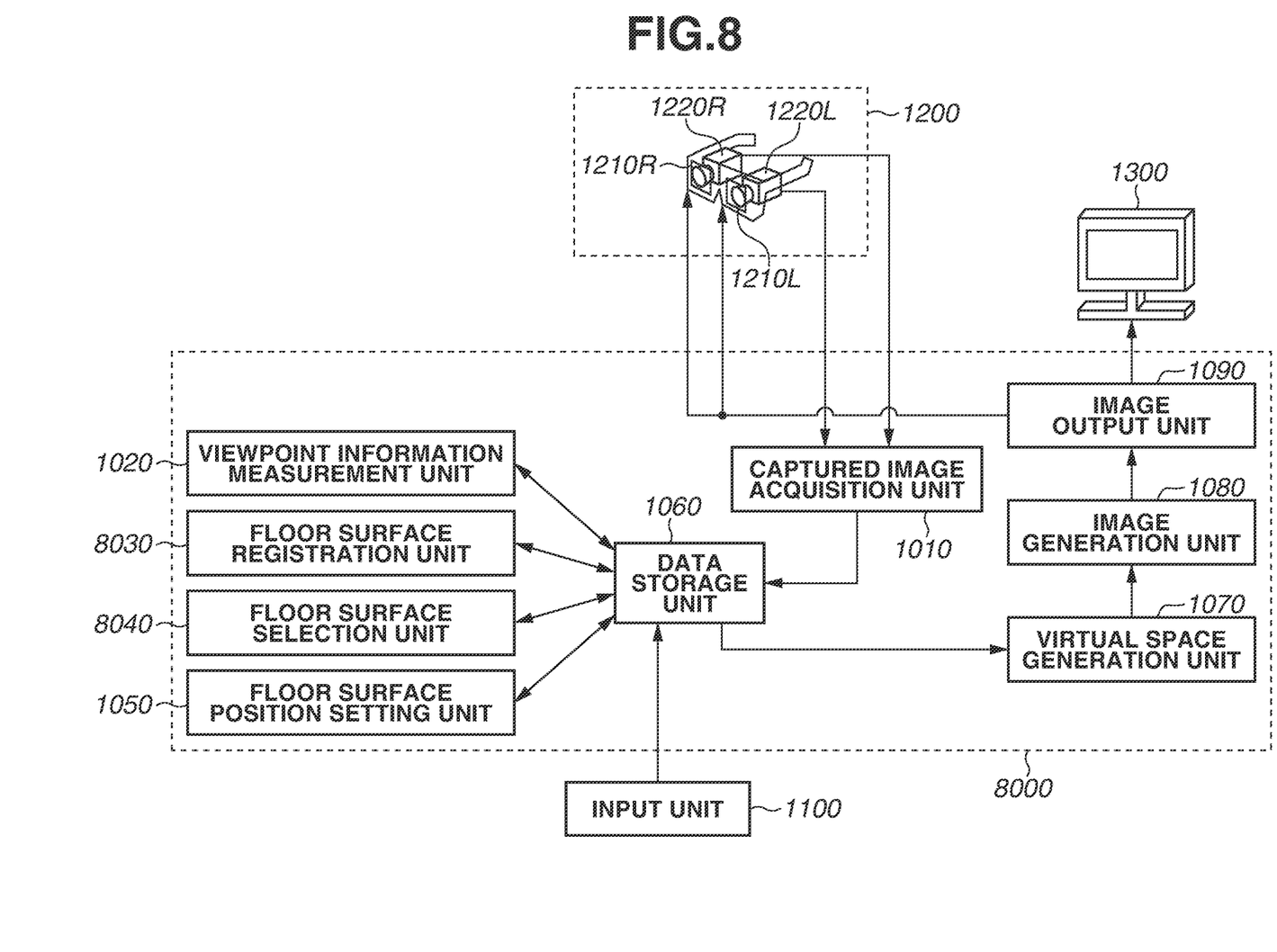
FIG. 8 is a block diagram illustrating a functional configuration of a system according to a second exemplary embodiment.

FIG. 8 is a block diagram illustrating an example of a functional configuration of a system according to a second exemplary embodiment. A configuration that is the same as that in FIG. 1 is not described. As illustrated in FIG. 8, the system according to the present exemplary embodiment includes an information processing apparatus 8000, the input unit 1100, the display device 1300, and the HMD 1200. The information processing apparatus 8000 includes the captured image acquisition unit 1010, the viewpoint information measurement unit 1020, a floor surface registration unit 8030, a floor surface selection unit 8040, the floor surface position setting unit 1050, the data storage unit 1060, the virtual space generation unit 1070, the image generation unit 1080, and the image output unit 1090. The information processing apparatus 8000 and the HMD 1200 are connected so as to enable data communications therebetween. The connection can be conducted in a wired or wireless manner.

First, the information processing apparatus 8000 will be described. The captured image acquisition unit 1010, the viewpoint information measurement unit 1020, the floor surface position setting unit 1050, the data storage unit 1060, the virtual space generation unit 1070, the image generation unit 1080, and the image output unit 1090 are similar to those illustrated in FIG. 1.

The floor surface registration unit 8030 stores data concerning a floor surface input from the input unit 1100 in a data storage unit 1060, as will be described in detail with reference to FIG. 9.

Figure 9:
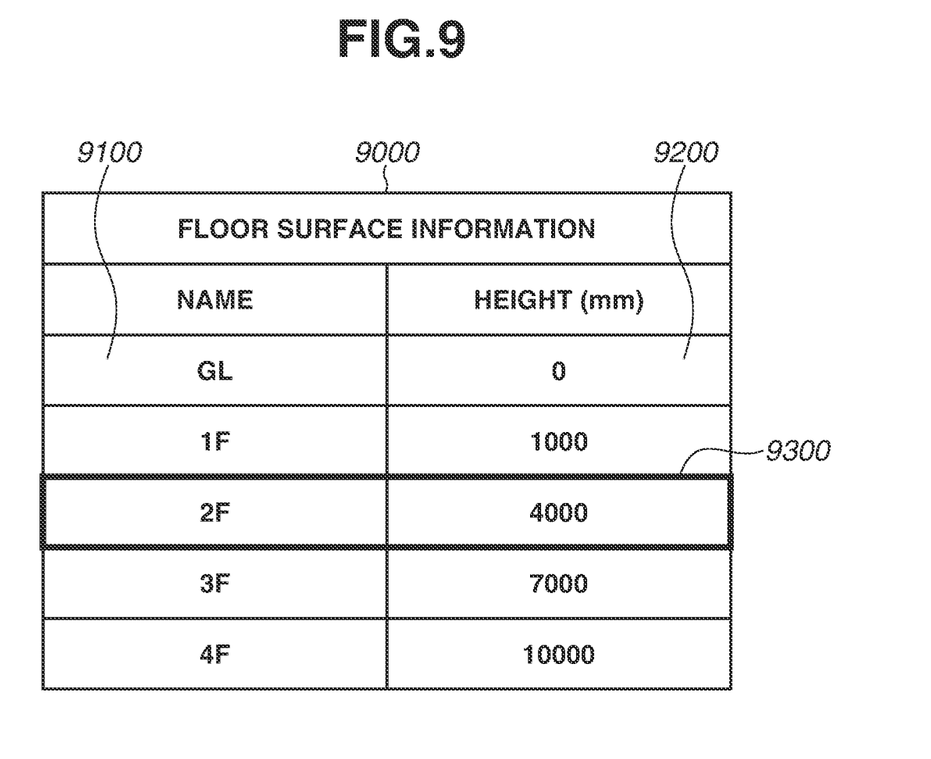
FIG. 9 is a diagram schematically illustrating a floor surface registration screen.

FIG. 9 is a diagram schematically illustrating a floor surface registration screen 9000 used by the floor surface registration unit 8030 for the registration. A name input field 9100 is a field where a name is input and displayed, based on information input by the viewer through the input unit 1100. This information is stored in the data storage unit 1060. A height input field 9200 is a field for inputting and displaying height information based on information input by the viewer through the input unit 1100. The information is stored in the data storage unit 1060.

The floor surface selection unit 8040 selects a predetermined floor surface from a plurality of floor surface candidates stored in the data storage unit 1060, and stores the information of the selected floor surface in the data storage unit 1060. A method of selecting the floor surface is described in detail with reference to a flowchart in FIG. 11.

The floor surface position setting unit 1050 sets the height position of the floor surface in the virtual space based on the floor surface information that is stored in the data storage unit 1060 and corresponds to the floor surface selected by the floor surface selection unit 8040. A setting method is described in detail below with reference to the flowchart in FIG. 11.

Figure 10:
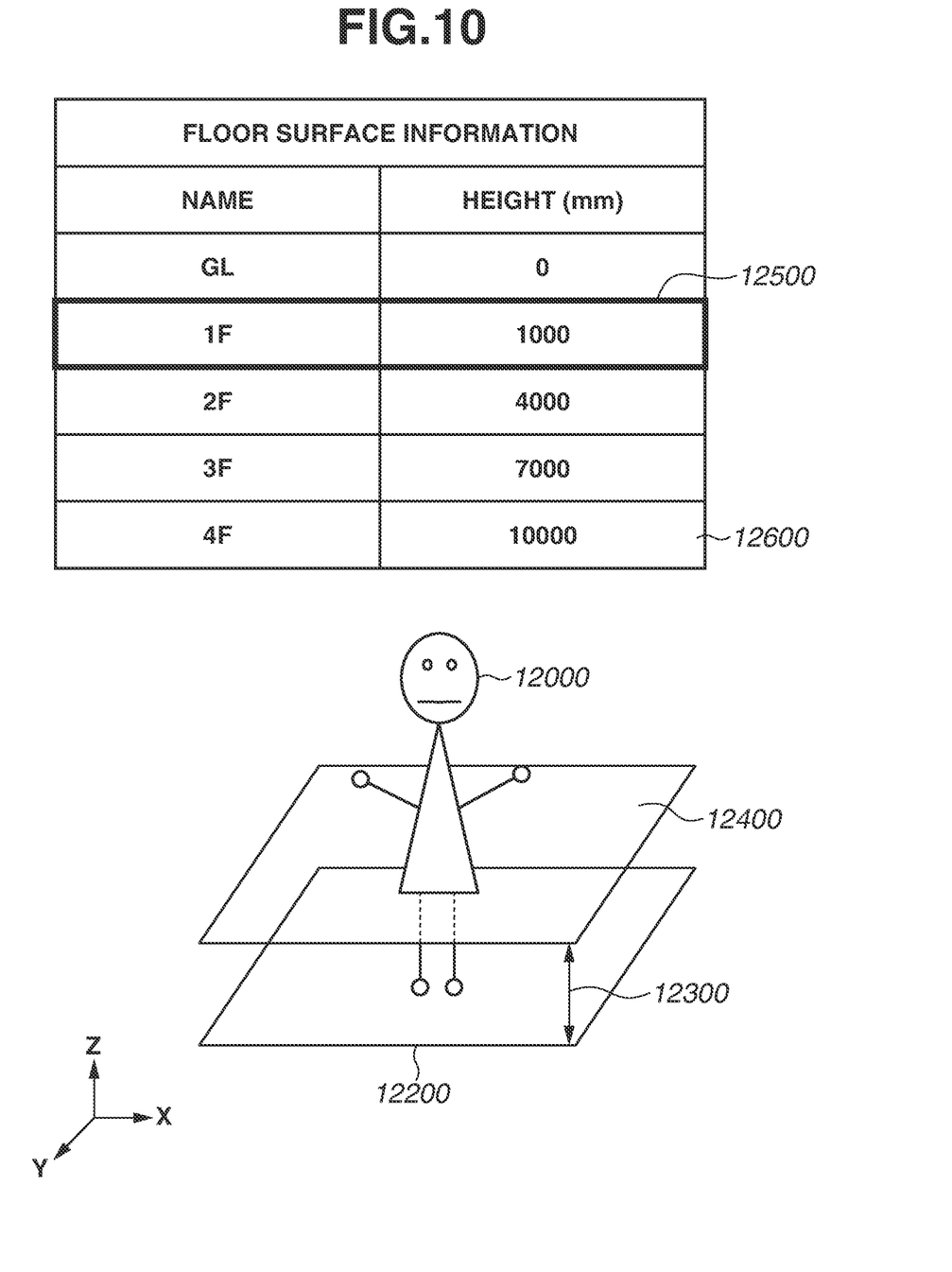
FIG. 10 is a diagram illustrating how the floor surface is selected and moved.
Figure 11:
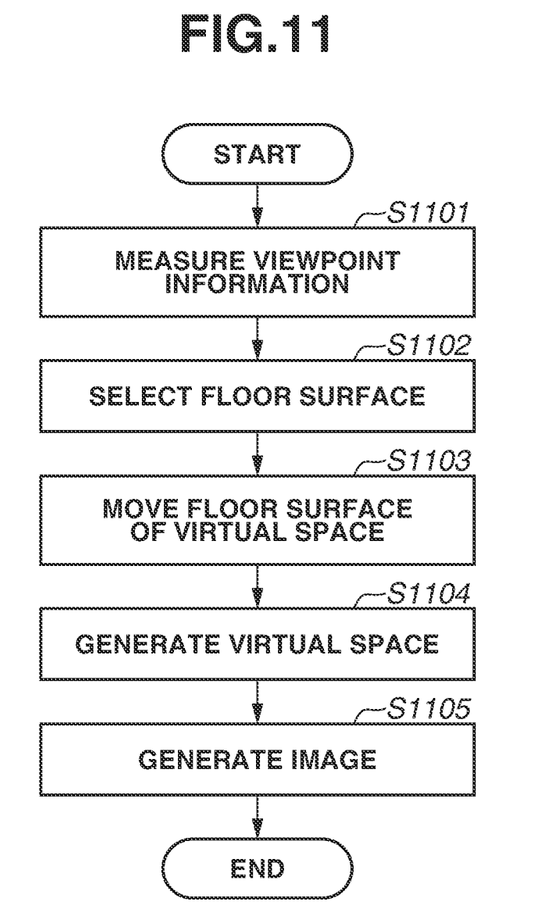
FIG. 11 is a flowchart illustrating a procedure of processing according to the second exemplary embodiment.

FIG. 11 is a flowchart illustrating a procedure of processing executed by the information processing apparatus 8000. The processing is executed for generating an MR image after the floor surface information has been registered by the registration unit 8030, and outputting the MR image to the HMD 1200 or the display device 1300. Processing that is the same as that in FIG. 6 will not be described. FIG. 10 illustrates how a floor surface is selected in step S1102 and how the floor surface is moved in step S1103. First, FIG. 10 is described, and then each step in FIG. 11 is described.

Floor surface information registered in advance by the floor surface registration unit 8030 is displayed in a selectable manner in a GUI 12600. In the illustrated example, floor numbers and heights of the floor surfaces are displayed. The GUI 12600 can be displayed on a virtual space or can be displayed in other forms, such as a dialog. A floor surface selection field 12500 indicates a floor surface selected from the information registered in the floor surface registration unit 8030, based on an event input by the viewer through the input unit 1100.

The viewer 1200 is a simple representation of the person experiencing the MR. A floor surface 12200 is a floor surface of the real space. A virtual floor surface 12400 is a floor surface existing in the virtual space. In the present exemplary embodiment, a distance 12300 corresponds to a height (e.g., 1000 mm in the present exemplary embodiment) registered in the floor surface registration unit 8030.

In step S1102, the floor surface selection unit 8040 selects a floor surface from a plurality of pieces of floor surface information on the GUI 12600, based on an operation performed on the input unit 1100. In step S1103, the surface floor position setting unit 1050 moves the floor surface 12400 in the virtual space toward the floor surface 12200 in the real space by the distance 12300, based on the floor surface information selected in step S1102, so as to match the height therebetween. In steps S1104 and S1105, the virtual space generation unit 1070 generates the virtual space and the image generating unit 1080 generates an image obtained by overlaying the virtual image on the actual image as in steps S604 and S605.

In the exemplary embodiments described above, a case is described in which the floor surface in the virtual space is aligned with the floor surface in the real space when the image in the virtual space is displayed on the image in the real space in an overlapping manner. The floor surface in the virtual space can also be aligned with the floor surface in the real space when only the image in the virtual space is displayed. Thus, the viewer viewing the image in the virtual space can view an image with a little uncomfortable feeling compared with the real space where the viewer is positioned.

In the exemplary embodiments described above, a case is described where the floor surface in the virtual space is aligned with the floor surface in the real space. Alternatively, a surface other than the floor surface can be a reference surface for the alignment. For example, a surface of a workbench in the virtual space can be aligned with a surface of a workbench in the real space.

The components of the information processing system illustrated in FIG. 1 are described as being implemented by hardware in the exemplary embodiments described above. Alternatively, some of the components can be implemented by software. In such a case, a computer having the remaining components implemented by hardware executes the software to perform the operations of the information display device described in the exemplary embodiments described above.

Figure 12:
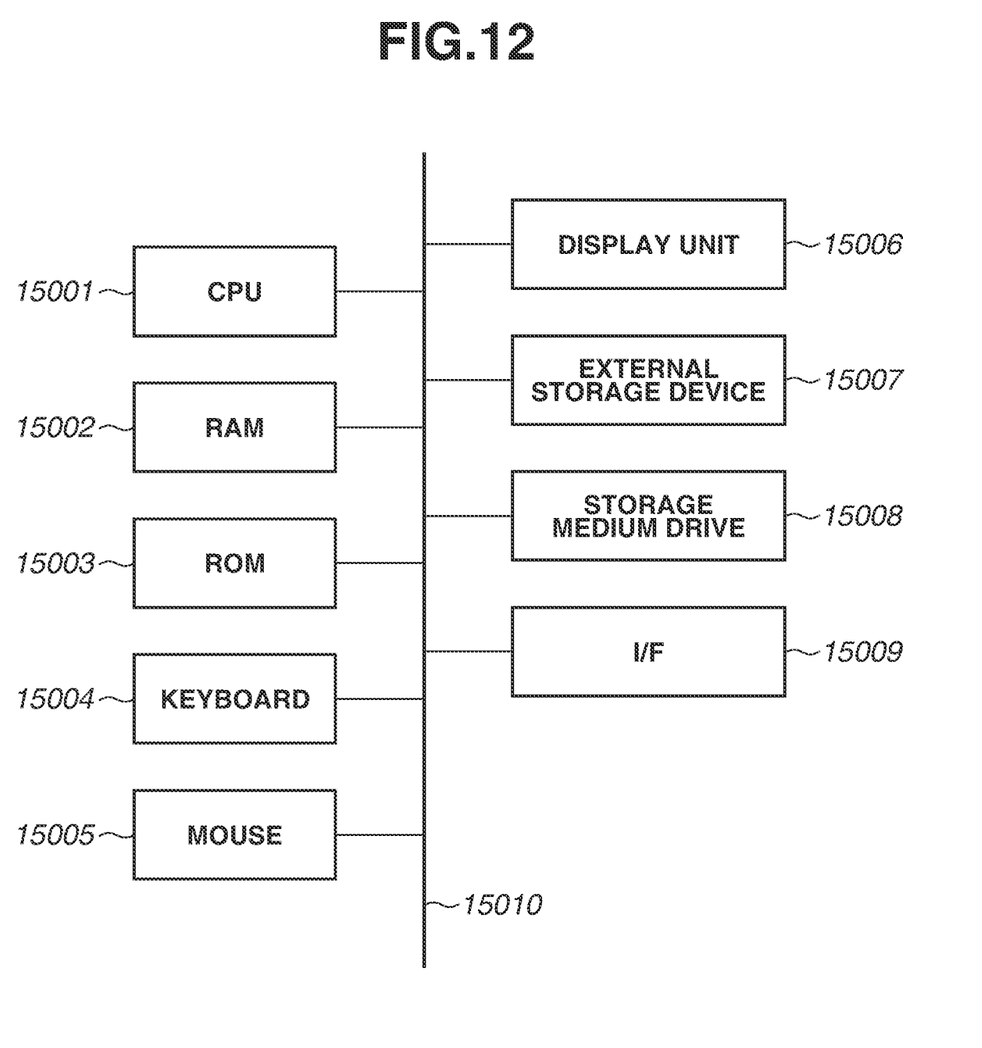
FIG. 12 is a block diagram illustrating a hardware configuration of the system according to the exemplary embodiments.

FIG. 12 is a block diagram illustrating a hardware configuration of the information processing system according to the exemplary embodiments. A central processing unit (CPU) 15001 controls the entire computer by using a program and data stored in a random-access memory (RAM) 15002 and a read-only memory (ROM) 15003, and executes the processing described above, which has been described as being executed by the information processing apparatus 1000 in the exemplary embodiments described above.

The RAM 15002 has an area for temporarily storing a program and data loaded from an external storage device 15007 and a storage medium drive 15008. The RAM 15002 also includes an area for temporarily storing data to be transmitted to the outside through an interface (I/F) 15009. The RAM 15002 includes a work area used by the CPU 15001 to execute various types of processing. In other words, the RAM 15002 can provide various areas as appropriate. For example, the RAM 15002 also functions as the data storage unit 1020 illustrated in FIG. 1.

The ROM 15002 stores setting data and a boot program for the computer. A keyboard 15004 and a mouse 15005 are examples of an operation input device. The viewer using the computer can issue various instructions to the CPU 15001 by operating the operation input device.

A display unit 15006 includes a cathode ray tube (CRT) or a liquid crystal screen, and can display a result of the processing executed by the CPU 15001 with images and texts.

The external storage device 15007 is a large capacity information storage device represented by an HDD device. The external storage device 15007 stores an operating system (OS), as well as a program and data for causing the CPU 15001 to execute the processing described above as being executed by the information processing apparatus. The program includes programs corresponding to the captured image acquisition unit 1010, the viewpoint information measurement unit 1020, the floor surface obtaining unit 1030, the floor surface selection unit 1040, the floor surface position setting unit 1050, the virtual space generation unit 1070, the image generation unit 1080, and the image output unit 1090. The data includes data concerning MR experience environment information, and the known information described above.

The program and the data stored in the external storage device 15007 are loaded onto the RAM 15002 as appropriate, in accordance with the control performed by the CPU 15001. The CPU 15001 executes processing by using the loaded program and data, and thus executes the processing described as being executed by the information processing apparatus. The external storage device 15007 can be used as the data storage unit 1060 illustrated in FIG. 1.

The storage medium drive 15008 reads a program and data stored in a storage medium such a compact disc (CD)-ROM or a digital versatile disc (DVD)-ROM, and writes a program and data to such a storage medium. The storage medium can store a part of or all the programs and data described as being stored in the external storage device 15007. The program and data, read from the storage medium by the storage medium drive 15008, are output to the external storage device 15007 and the RAM 15002.

The I/F 15009 includes a digital input/output port such as a universal serial bus (USB) and an Ethernet® port with which an image is output to the display device 1010. Data received through the I/F 2009 is input to the RAM 15002 and the external storage device 15007. The components described above are connected to each other via a bus 15010.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-032477, filed Feb. 23, 2016, which is hereby incorporated by reference herein in its entirety.

What is claimed is:

1. An information processing apparatus comprising:
one or more processors; and
one or more memories storing instructions, when executed by the one or more processors, causing the information processing apparatus to:
acquire viewpoint information concerning a viewer;
input virtual space data;
specify a virtual reference surface corresponding to a real reference surface in the virtual space data;
determine positional relationship between the virtual reference surface and the real reference surface;
correct the virtual space data based on the positional relationship; generate a display image based on the corrected virtual space data and the viewpoint information;
present a plurality of candidates of the reference surface in the virtual space on a display which the viewer is able to see;
present real space information indicating each of the plurality of candidates of the reference surface on the display which the viewer is able to see; and
select, as the reference surface in the virtual space, a candidate selected from the plurality of candidates on the basis of instruction of the viewer.

2. The information processing apparatus according to claim 1, when executed by the one or more processors, further causing the information processing apparatus to:
extract at least one bottom surface from the virtual space data; and
select, from the extracted at least one bottom surface, a bottom surface as the reference surface in the virtual space.

3. The information processing apparatus according to claim 2, wherein, based on a distance between the real reference surface and the extracted at least one bottom surface, the bottom surface as the reference surface in the virtual space is selected.

4. The information processing apparatus according to claim 2, wherein, based on number of vertices of each of the extracted at least one bottom surface, the bottom surface as the reference surface in the virtual space is selected.

5. The information processing apparatus according to claim 2, wherein, based on an area of each of the extracted at least one bottom surface, the bottom surface as the reference surface in the virtual space is selected.

6. The information processing apparatus according to claim 2, wherein a surface with a normal line extending vertically upward as the bottom surface is extracted.

7. The information processing apparatus according to claim 6, wherein, as the bottom surface, a surface with the normal line extending vertically upward and having a distance longer or equal to a predetermined length from a closest one of surfaces with the normal line extending vertically downward is extracted.

8. The information processing apparatus according to claim 1, wherein the viewpoint information based on an image captured is acquired.

9. The information processing apparatus according to claim 1, wherein the viewpoint information includes a position of a viewpoint of the viewer.

10. The information processing apparatus according to claim 1, wherein the viewpoint information includes an orientation of a viewpoint of the viewer.

11. The information processing apparatus according to claim 1, wherein the reference surface is a floor surface.

12. The information processing apparatus according to claim 1, wherein data on the virtual space based on a distance between the reference surface in the virtual space and the reference surface in the real space is shifted.

13. The information processing apparatus according to claim 1, when executed by the one or more processors, further causing the information processing apparatus to input a captured image in the real space, and
wherein the display image by combining the corrected virtual space data and the captured image in the real space is generated.

14. An information processing method comprising:
acquiring viewpoint information concerning a viewer;
inputting virtual space data; specifying a virtual reference surface corresponding to a real reference surface in the virtual space data;
determining positional relationship between the virtual reference surface and the real reference surface;
correcting the virtual space data based on the positional relationship; generating a display image based on the corrected virtual space data and the viewpoint information;
presenting a plurality of candidates of the reference surface in the virtual space on a display which the viewer is able to see;
presenting real space information indicating each of the plurality of candidates of the reference surface on the display which the viewer is able to see; and
selecting, as the reference surface in the virtual space, a candidate selected from the plurality of candidates on the basis of instruction of the viewer.

15. A non-transitory computer-readable storage medium storing computer-executable instructions for causing a computer to implement an information processing method, the information processing method comprising:
acquiring viewpoint information concerning a viewer;
inputting virtual space data;
specifying a virtual reference surface corresponding to a real reference surface in the virtual space data;
determining positional relationship between the virtual reference surface and the real reference surface;
correcting the virtual space data based on the positional relationship;
generating a display image based on the corrected virtual space data and the viewpoint information;
presenting a plurality of candidates of the reference surface in the virtual space on a display which the viewer is able to see;
presenting real space information indicating each of the plurality of candidates of the reference surface on the display which the viewer is able to see; and
selecting, as the reference surface in the virtual space, a candidate selected from the plurality of candidates on the basis of instruction of the viewer.

* * * * *